United States Patent [19]
Kohls et al.

[11] 3,896,892
[45] July 29, 1975

[54] MANUAL CONTROL FOR A SELF-PROPELLED VEHICLE

[75] Inventors: James P. Kohls, Petoskey; Robert J. Borgman, Harbor Springs; Frederic W. Campbell, Cross Village, all of Mich.

[73] Assignee: Jervis B. Webb Company, Detroit, Mich.

[22] Filed: Sept. 20, 1973

[21] Appl. No.: 398,960

[52] U.S. Cl. ............... 180/19 H; 200/157; 335/206
[51] Int. Cl. ............................................. B62d 51/04
[58] Field of Search............... 180/19 S, 19 H, 19 R; 200/157, 172 R; 335/206

[56] References Cited
UNITED STATES PATENTS

| | | | |
|---|---|---|---|
| 2,138,239 | 11/1938 | Irgens | 180/19 H |
| 2,498,651 | 2/1950 | Crom | 200/172 R |
| 3,225,853 | 12/1965 | Norton et al. | 180/19 H |
| 3,253,338 | 5/1966 | Burnette | 335/206 X |
| 3,557,893 | 1/1971 | Kohls | 180/19 H |

Primary Examiner—Robert R. Song
Assistant Examiner—John A. Pekar
Attorney, Agent, or Firm—Farley, Forster and Farley

[57] ABSTRACT

A self-propelled vehicle is equipped with a forwardly extendable tiller having a handgrip which can be held by an operator on foot and moved longitudinally of the tiller to regulate the direction and speed of operation of the vehicle drive motor. The handgrip is biased to a neutral position, which corresponds to a de-energized condition of the drive motor. From the neutral position and relative to the rear and front of the vehicle, rearward handgrip movement energizes the drive motor in reverse; and, forward handgrip movement energizes the drive motor in the forward direction, with a sensible transition being provided in the forward handgrip movement to enable the operator to distinguish a shift from first to second forward speeds. Control over the operation of the drive motor is accomplished by reed switches mounted in the tiller and actuatable by a magnet moved by the handgrip.

10 Claims, 6 Drawing Figures

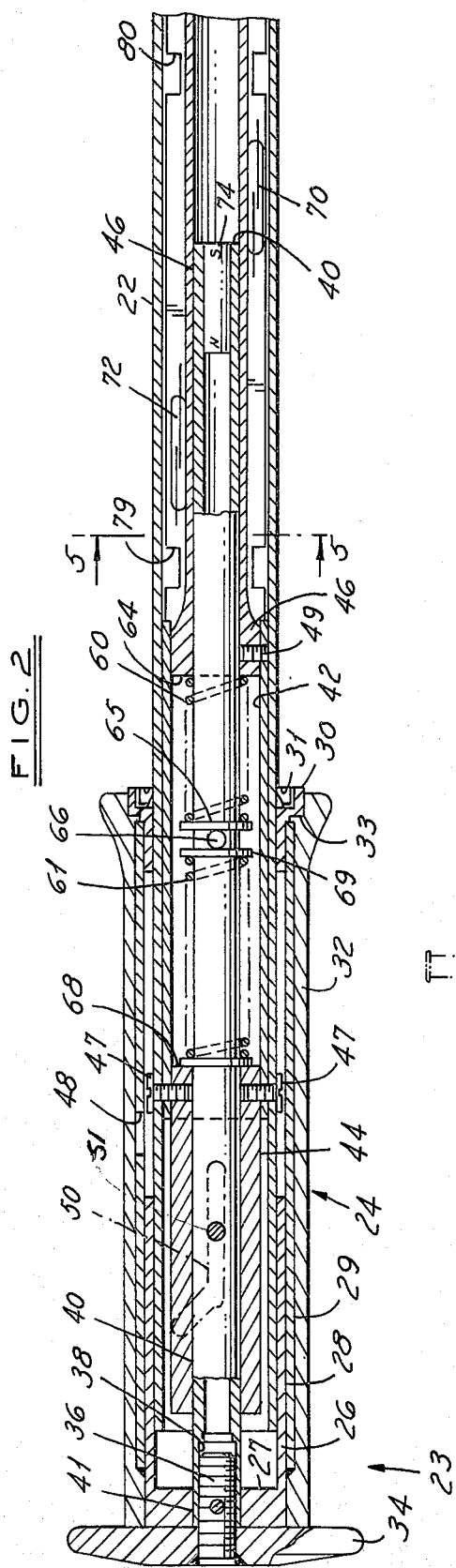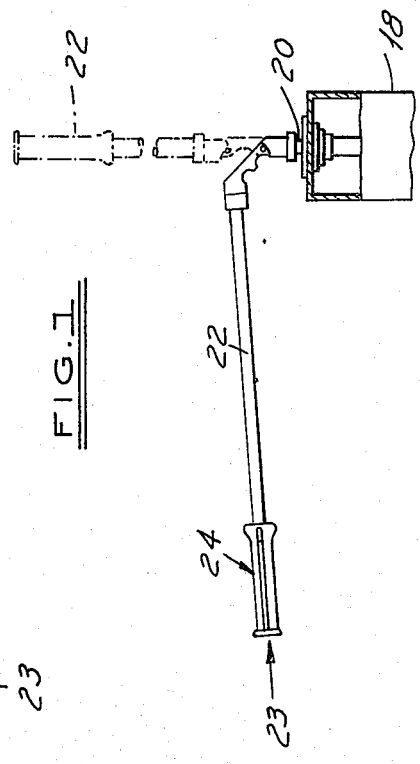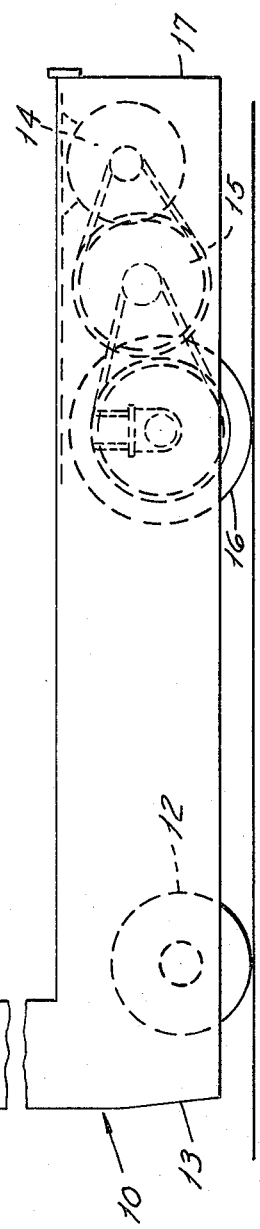

MANUAL CONTROL FOR A SELF-PROPELLED VEHICLE

SUMMARY OF THE INVENTION

This invention relates to improvements in a manual control for a self-propelled vehicle which allows the vehicle to be driven and steered by an operator on foot.

The invention is particularly useful in the manual control of a self-propelled vehicle of the driverless type which is automatically operable over a guide path. Such a vehicle is disclosed in U.S Pat. No. 3,557,893, and is equipped for manual operation with a tiller extendable forwardly of the vehicle and provided with a handgrip. Pivotal movement of the tiller relative to the vehicle enables the vehicle to be steered; and, movement of the handgrip on the tiller regulates the operation of the vehicle driving motor.

In the manual control of the present invention, a tiller and handgrip are also employed, the tiller being extendable forwardly of the vehicle for manually controlling a steerable wheel and being provided with a handgrip which can be held by an operator on foot and moved to regulate the operation of the vehicle driving motor. The handgrip is mounted on the tiller for movement generally longitudinally thereof in directions which extend rearwardly and forwardly from a neutral position to which the handgrip is normally biased by suitable means such as a spring, the neutral position corresponding to a de-energized condition of the driving motor. Control means responsive to such rearward movement of the handgrip operates the vehicle driving motor in the reverse direction of vehicle movement, and operates the vehicle driving motor in the forward direction of movement of the vehicle in response to forward movement of the handgrip. The mounting of the handgrip includes structure which defines a sensible transition to the operator in the longitudinal handgrip movement between at least one speed of the vehicle driving motor and another speed thereof.

All movements of the handgrip from the neutral position thereof produce a corresponding direction of movement of the vehicle and are natural and instinctive to an operator so that little experience is required to master the control. This provides a safety factor in case the vehicle is operated by a person of little or no experience, and a further safety factor is provided by the biasing of the handgrip to the neutral position, so that if the handgrip is released the vehicle stops. The transition in handgrip movement between forward vehicle speeds also contributes to the safety of the control and to the confidence of an operator.

In the preferred construction, the control means responsive to handgrip movements for regulating the operation of the vehicle driving motor consist of a plurality of reed switches mounted within the tiller and selectively actuatable by a magnet movable with the handgrip.

Other features and advantages of the invention will appear from the description to follow of the embodiment thereof disclosed in the accompanying drawings.

DESCRIPTION OF THE DRAWINGS

FIG. 1 is a side elevation of a self-propelled vehicle equipped with a forwardly extendable tiller for manual operation;

FIG. 2 is an enlarged longitudinal sectional elevation of the free end of a tiller constructed in accordance with the invention;

DESCRIPTION OF THE PREFERRED EMBODIMENT

Figure 6:
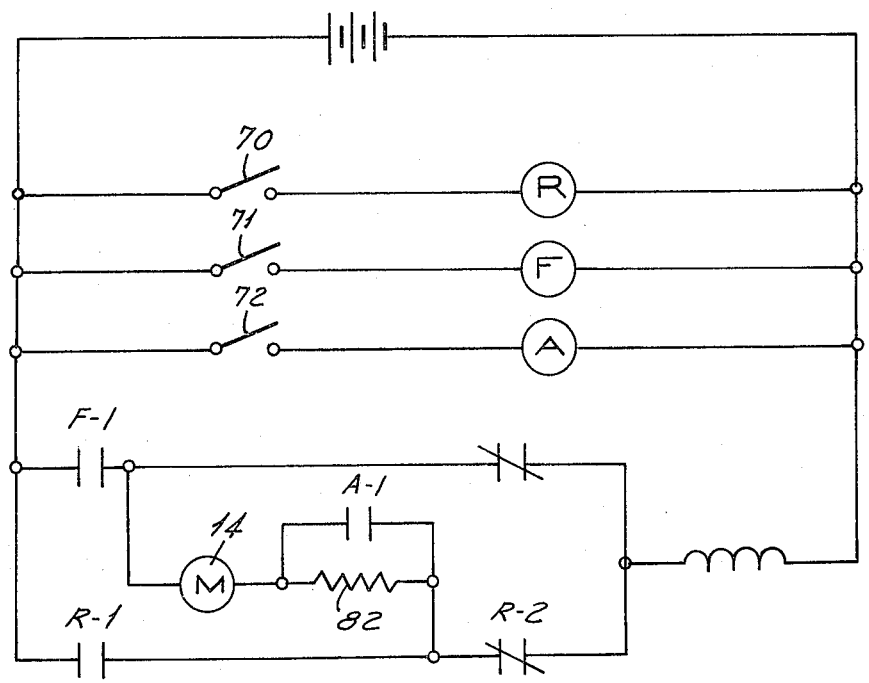

FIG. 1 illustrates the principal components of a self-propelled vehicle 10 having a steerable wheel 12 at the front end 13 thereof and a driving motor 14 connected by a drive train 15 to wheels 16 mounted near the rear end 17 of the vehicle, the driving motor being operable in reverse and in a plurality of forward speeds. An upstanding pedestal 18 is provided at the front of the vehicle 10. A steering shaft 20, mounted on the pedestal 18, is suitably connected to the steerable wheel 12, and a tiller 22 is connected to the upper end of the shaft 20. The tiller 22 is extendable forwardly of the vehicle from the position shown in broken line to the position shown in full line and is provided at its forward or free end 23 with a movable handgrip 24 for regulating the operation of the driving motor 14. The vehicle 10 is of the general type disclosed in U.S. Pat. No. 3,557,893, to which reference should be made for further details of the relationship between the steering shaft 20, the steerable wheel 12 and the connection of the tiller 22 to the shaft 20.

The present invention is concerned with improvements in the manual control of the vehicle 10 afforded by the tiller 22 and handgrip 24, which improvements are incorporated in the construction shown in FIG. 2.

In this construction, the tiller 22 consists of a cylindrical tube, and the handgrip 24 is mounted thereon by suitable means to be described below for movement generally longitudinally of the tiller in directions which extend rearwardly and forwardly from a neutral position shown, the terms "forwardly" and "rearwardly" being used with relation to the rear and front ends of the vehicle 10. The handgrip 24 is an assembly consisting of a sleeve bushing 26 having an end wall 27 and a tubular portion 28 which slidably engages the outer surface of the tiller 22. A tube 29 engages the outer surface of the tubular portion 28 of the bushing 26 and is connected thereto; this tube 29 is also secured to the outer surface of a collar 30 slidable on the tiller 22 and carrying a seal 31. A tubular grip member 32 of plastic or rubber is mounted on the outside of the tube 29 and is positioned between a shoulder 33 on the collar 30 and a circular guard 34 of larger diameter than the grip 32.

A stud 36 secured to the guard 34 engages a threaded bore 38 formed in the end of a shaft 40, which end also extends into a hole 41 formed in the end wall 27 of the bushing 26. The shaft 40 is tubular, extends axially within the tiller tube 22, is movable with the handgrip 24 and is supported by a fixed structure mounted within and connected to the tiller 22.

This fixed structure includes a tube or spring holder 42, a tubular cam 44 extending into the forward end of the tube 42, and a tubular switch holder 46 extending into the rearward end of the tube 42. Screws 47 connect the tube 42 and the cam 44 to the tiller 22, these screws being accessible through an opening 48 in the tube 29 when the grip member 32 is removed; and, a set screw 49 connects the switch holder 46 to the tube 42. The handgrip shaft 40 extends through the tubular cam 44, into the tubular holder 46, and is slidably supported by these parts.

Figure 3:
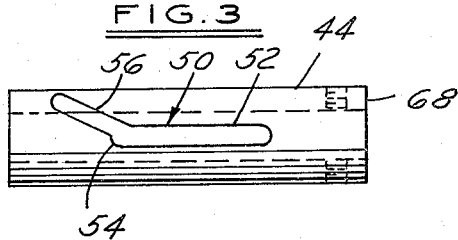
FIG. 3 is a side elevation of a guide or cam included in the construction of FIG. 2.
Figure 4:
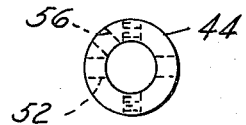
FIG. 4 is an end view of the guide of FIG. 3.

The cam 44, which forms part of the handgrip mounting means, is shown in detail in FIGS. 3 and 4 and is provided with a cam track 50 including a portion 52 extending longitudinally of the tiller in the forward and rearward directions of the movement of the handgrip from the neutral position thereof, the cam track being engaged by a follower pin 51 secured to the shaft 40. A sensible transition in the forward movement of the handgrip between each forward speed of the vehicle driving motor is defined by structure consisting of an abutment 54 on the cam track at the forward end of the portion 52 thereof followed by a second portion 56 of the cam track which extends angularly to the longitudinally extending portion 52.

The handgrip 24 is normally urged to the neutral position shown, which corresponds to a de-energized condition of the vehicle drive motor or a stopped condition of the vehicle 10, by a pair of springs 60 and 61 mounted on the shaft 40, the spring 60 being positioned between the end face 64 of the holder 46 and a washer 65 engaging a crosspin 66 carried by the shaft 40; and, the second spring 61 being positioned between a washer on the end face 68 of the cam 44 and a second washer 69 abutting the crosspin 66.

Figure 5:
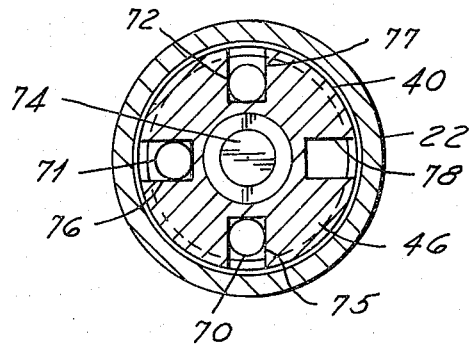
FIG. 5 is a transverse sectional elevation taken as indicated by the line 5—5 of FIG. 2; and, FIG. 6 is a schematic diagram of a control circuit for the drive motor of the vehicle.

Control means responsive to rearward movement of the handgrip from the neutral position cause the vehicle driving motor to be operated in the reverse direction of movement of the vehicle, and responsive to forward movement of the handgrip from the neutral position cause the vehicle driving motor to be operated in the forward direction of movement of the vehicle. These control means include a plurality of reed switches 70, 71 and 72, shown in FIGS. 2 and 5. Means including the non-magnetic holder 46, mount these reed switches on the tiller, and a magnet 74 fixed within the handgrip shaft 40 enables these reed switches to be selectively actuated by movement of the handgrip 24. As best shown in FIG. 5, the reed switches are each mounted on the holder 46 in one of a plurality of slots 75, 76 and 77 formed longitudinally in the holder in circumferentially spaced relation. A further slot 78 extends longitudinally of the holder 48 and communicates by circumferential notches 79 and 80 (FIG. 2) with each of the slots 75–77, the further slot and the notches being adapted to receive electrical connections to the reed switches, which connections extend through the tiller tube and to a control circuit on the vehicle.

Such a control circuit is schematically shown in FIG. 6. Referring thereto, when the handgrip 24 is moved rearwardly from the neutral position, the magnet 74 will cause the reed switch 70 to close, completing a circuit which energizes a reverse relay R, causing a normally open relay contact R-1 to close and a normally closed relay contact R-2 to open. As a result, the vehicle drive motor 14 is energized in the reverse direction of vehicle movement at slow speed through a resistance 82. Movement of the handgrip 24 forwardly from the neutral position to the limit of movement defined by the abutment 54 in the cam track 50 results in closing the reed switch 71, completing a circuit to a forward relay F, and causing a normally open contact F-1 thereof to close completing a circuit which energizes the vehicle drive motor 14 in the forward direction at slow speed through the resistance 82. If the handgrip 24 is then rotated slightly and moved forwardly as defined by the angular portion 56 of the cam track 50, the reed switch 72 is also closed by the magnet 74, energizing a relay A and closing a normally open contact A-1 thereof. This shunts out the resistance 82 and results in the vehicle drive motor being energized in the forward direction at a higher speed.

Since the reed switch holder 46 and the cam 44 are interconnected by the spring holder tube 42, the reed switches 70–72 can be accurately positioned relative to the limits of movement of the handgrip 24 and the magnet 74 defined by the portions 52, 54 and 56 of the cam track 50. Once the reed switches 70–72 are so positioned, they are preferably potted in the slots of the holder 46.

We claim:

1. A manual control for a self-propelled vehicle having a steerable wheel, a driving motor operable in reverse and forward speeds, and a tiller extendable forwardly of the vehicle for manually controlling the steerable wheel, the tiller being provided with a movable handgrip for regulating the operation of the driving motor, wherein the improvement comprises:

means mounting the handgrip on the tiller for movement generally longitudinally thereof in directions which extend rearwardly and forwardly from a neutral position, said mounting means including a cam and a follower, one of which is connected to the handgrip and the other of which is connected to the tiller, said follower engaging said cam which defines said movement of the handgrip and includes a portion extending longitudinally of the tiller and a second portion extending angularly to said longitudinally extending portion to define a sensible transition in said movement of the handgrip between at least one speed of the vehicle driving motor and another speed thereof;
 means normally urging the handgrip to said neutral position; and,
 control means responsive to said rearward movement of the handgrip for operating the vehicle driving motor in the reverse direction of movement of the vehicle, and responsive to said forward movement of the handgrip for operating the vehicle driving motor in the forward direction of movement of the vehicle.

2. A manual control for a self-propelled vehicle according to claim 1 wherein said cam is connected to the tiller and said follower is connected to the handgrip.

3. A manual control for a self-propelled vehicle according to claim 1 wherein the driving motor is operable in a plurality of forward speeds and said sensible transition in said movement of the handgrip is arranged between one forward and a second forward speed.

4. A manual control for a self-propelled vehicle according to claim 1 wherein said sensible transition in the movement of the handgrip is further defined by an abutment on the cam track located between said longitudinally and angularly extending portions thereof.

5. A manual control for a self-propelled vehicle according to claim 5 wherein said control means includes a plurality of reed switches, means mounting the reed switches on the tiller, and a magnet movable by the handgrip for selectively actuating the reed switches.

6. A manual control for a self-propelled vehicle according to claim 5 wherein the tiller is a tube, and the means mounting the reed switches on the tiller comprises a tubular holder positioned within the tube, said magnet being mounted within the holder, and means provided on the holder for mounting the reed switches thereon in positions corresponding to the positions of the magnet as determined by the forward and rearward movements of the handgrip.

7. A manual control for a self-propelled vehicle according to claim 6 wherein the magnet is mounted on a shaft connected to the handgrip and extending axially within the tiller tube and within the tubular holder, the holder serving to support the shaft.

8. A manual control for a self-propelled vehicle according to claim 7 wherein the means for mounting the reed switches on the holder comprises a plurality of slots formed longitudinally in the holder in circumferentially spaced relation, in which slots the reed switches are mounted.

9. A manual control for a self-propelled vehicle according to claim 8 wherein the tubular holder is provided with a further slot extending longitudinally of the holder and communicating in a circumferential direction with the reed switch mounting slots, the further slot being adapted to receive electrical connections to the reed switches.

10. A manual control for a self-propelled vehicle according to claim 1 wherein the tiller is a tube, a shaft connected to the handgrip and extending longitudinally within said tube, a tubular cam connected to the tiller and slidably supporting said shaft, said cam including a cam track engageable by a follower on the shaft; said sensible transition in the movement of the handgrip is defined by a change in the shape of the cam; said control means includes a plurality of reed switches, a tubular reed switch holder mounted within the tube in fixed longitudinal relation thereto and slidably supporting said shaft, a magnet connected to said shaft for selectably actuating the reed switches; and said means normally urging the handgrip to said neutral position comprise spring means mounted on the shaft and positioned between said tubular cam and said tubular reed switch holder.

* * * * *